Oct. 30, 1951 C. N. PADEN 2,573,597
BEARING LUBRICATION
Filed Jan. 28, 1948 3 Sheets-Sheet 3
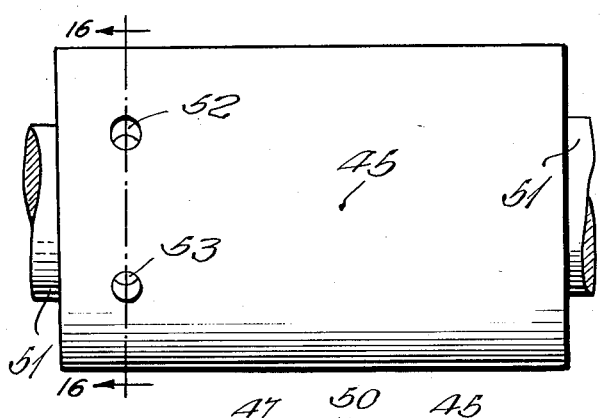
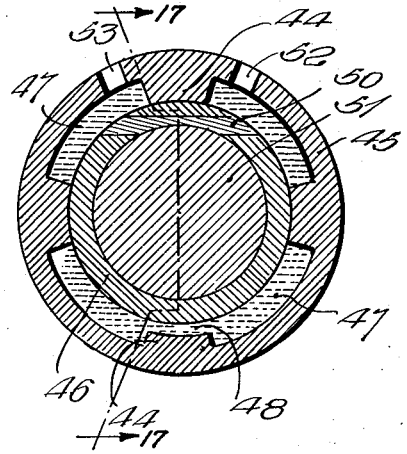
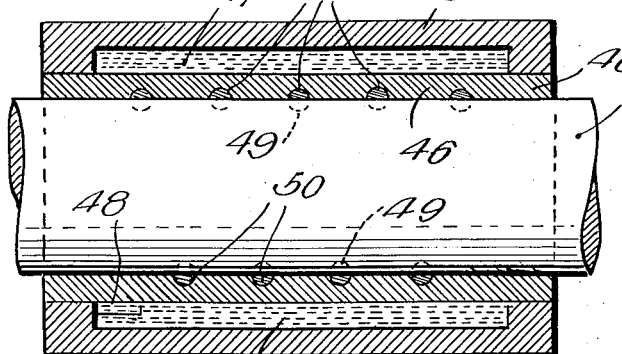
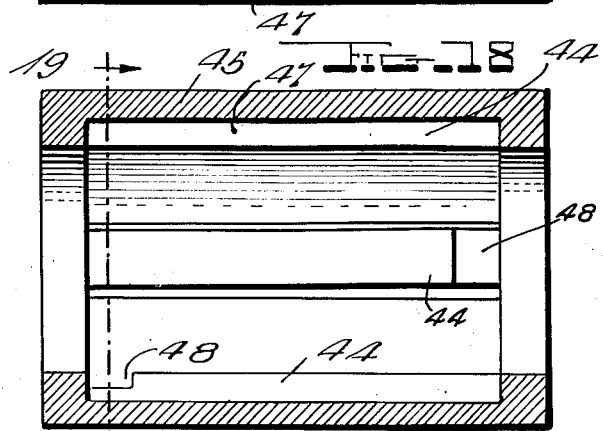
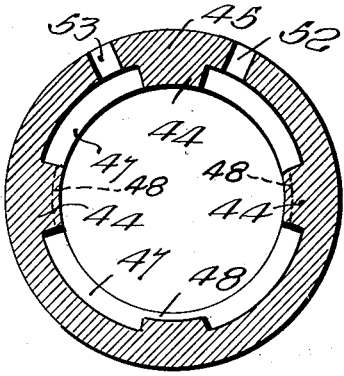
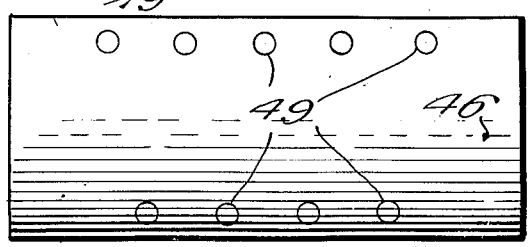
INVENTOR
CARTER N. PADEN
BY
Shreve, Crowe & Gordon
ATTORNEYS Patented Oct. 30, 1951

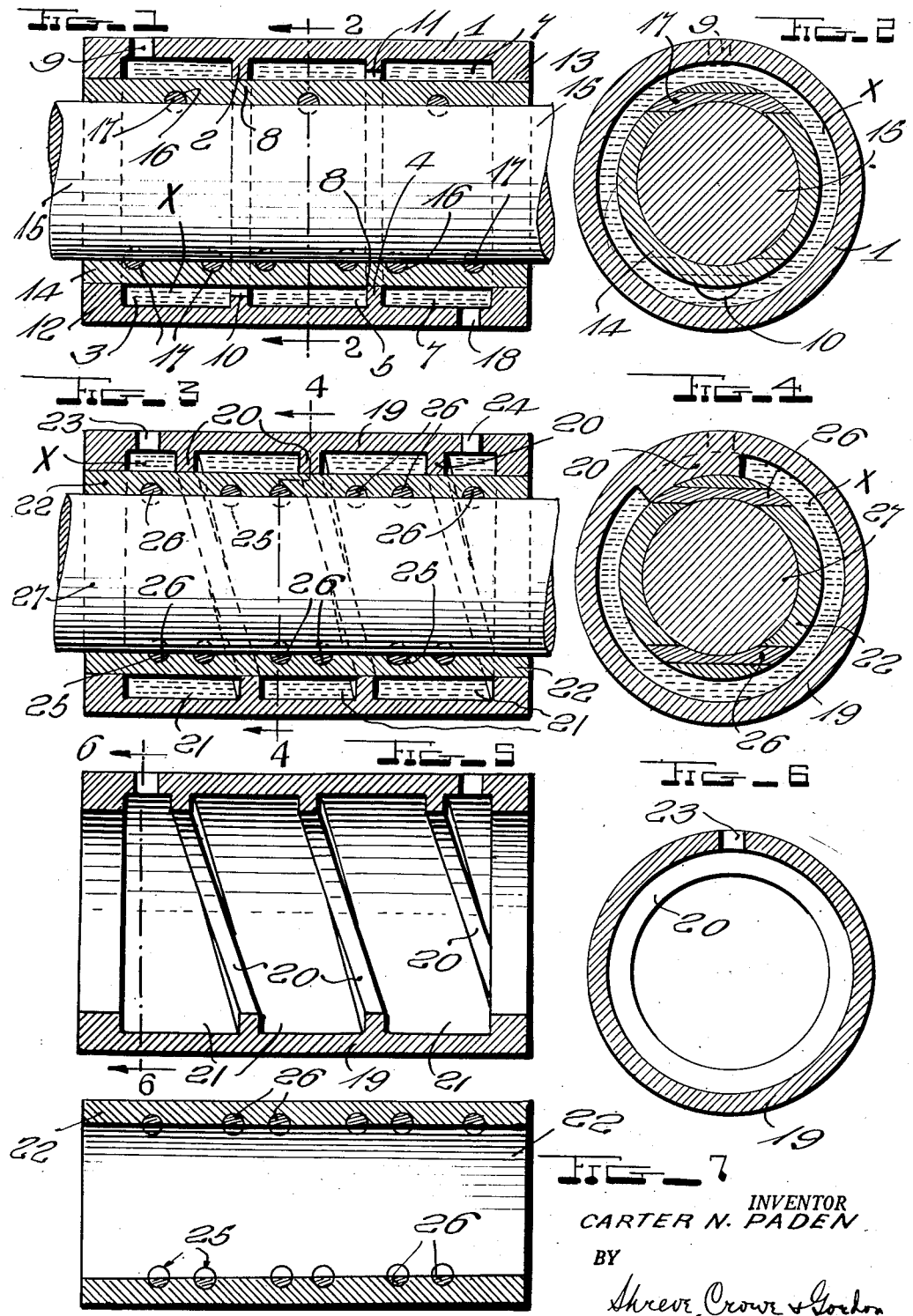

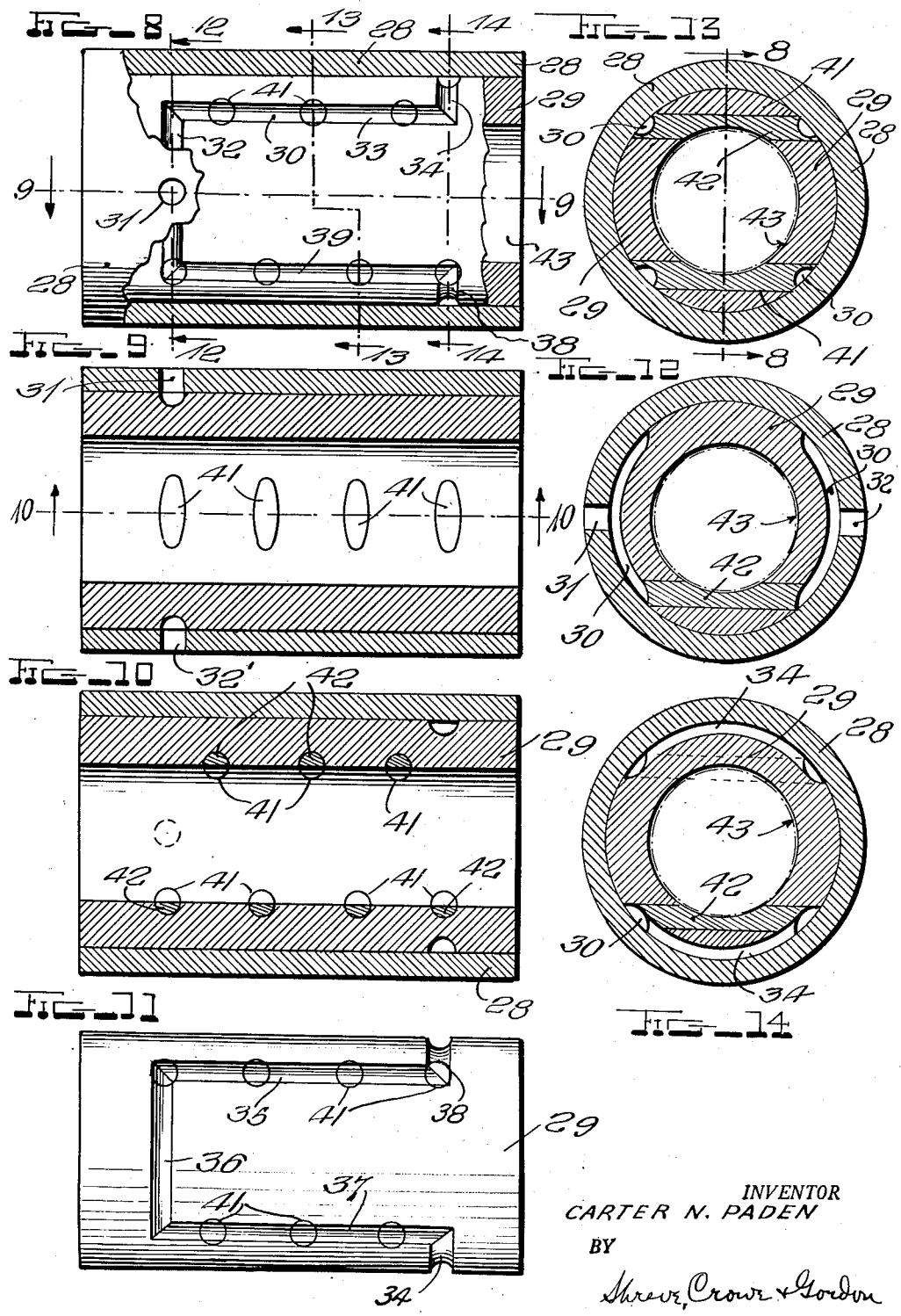

2,573,597

UNITED STATES PATENT OFFICE 2,573,597

BEARING LUBRICATION

Carter N. Paden, Chattanooga, Tenn.

Application January 28, 1948, Serial No. 4,837

11 Claims. (Cl. 308—76)

The present invention relates to improved machine elements that are adapted to be incorporated in precision machines, such as precision lathes, by way of illustration. More particularly, the invention relates to a construction of bearings, which prevents overheating of the shafts operating in the bearings, while providing efficient lubrication of the operating element.

Thus, on very high precision lathes, for example, great trouble is experienced because of the bearings becoming hot, which in turn heats up the head-stock, which heat causes the head-stock to expand materially, causing errors in tooling set-ups. As the bearing becomes hotter, the expansion, and resulting discrepancy, increases. This factor constitutes a continual source of difficulty in the production of precision work. In some instances it is necessary to start the machines several hours before work is to be done on them so that the bearings will reach their maximum temperature before the machines are put in production.

In order to obviate this and other troubles, resulting from overheating bearings, the invention provides an improved self-cooling and self-lubricating bearing, which efficiently cools and lubricates the operating parts, while enabling substantial reduction in the thickness and weight of the parts of the bearing assembly.

A further object of the invention is to provide improved circulating means for lubricating oil, which oil is used both for lubricating and cooling purposes.

A still further object of this invention is to provide a self-lubricating and self-cooling bearing that is of minimum weight while preventing deflecting of the cooperating parts by providing continuous support therefor.

Further objects of the invention will become apparent as the description proceeds, and the features of novelty will be pointed out in particularity in the appended claims.

The invention will be understood more readily by reference to the accompanying drawings, in which Fig. 1 is a longitudinal sectional elevation of one form of an improved bearing constructed in accordance with the present invention.

Fig. 2 is a transverse sectional elevation taken on the line 2—2 of Fig. 1, looking in the direction of the arrows.

Fig. 3 is a longitudinal sectional elevation of another form of construction.

Fig. 4 is a transverse sectional elevation of the modification of Fig. 3, taken on the line 4—4 of Fig. 3, looking in the direction of the arrows.

Fig. 5 is a longitudinal sectional elevation of the outer element of the construction of Fig. 3.

Fig. 6 is a transverse sectional elevation on the line 6—6 of Fig. 5, looking in the direction of the arrows.

Fig. 7 is a longitudinal sectional elevation of the inner member of the modification of Fig. 3.

Fig. 8 is a partial longitudinal sectional elevation of a further modification taken on the line 8—8 of Fig. 13, looking in the direction of the arrows.

Fig. 9 is a longitudinal sectional elevation of the construction of Fig. 8 taken on the line 9—9 of Fig. 8, looking in the direction of the arrows.

Fig. 10 is a further longitudinal sectional elevation of the modification of Fig. 8, taken on the line 10—10 of Fig. 9, looking in the direction of the arrows.

Fig. 11 is a side elevation of the inner member of the modification of Fig. 8.

Fig. 12 is a transverse sectional elevation taken on the line 12—12 of Fig. 8.

Fig. 13 is a further transverse sectional elevation taken on the line 13—13 of Fig. 8.

Fig. 14 is a still further transverse sectional elevation taken on the line 14—14 of Fig. 8.

Fig. 15 is a side elevation of a further modification embodying the features of the invention.

Fig. 16 is a transverse sectional elevation through the modification of Fig. 15, the view being taken on the line 16—16 of Fig. 15 with the port holes at the top.

Fig. 17 is a longitudinal sectional elevation taken on the line 17—17 of Fig. 16, looking in the direction of the arrows.

Fig. 18 is a view similar to Fig. 17, but showing only the outer cylinder.

Fig. 19 is a transverse sectional elevation taken on the line 19—19 of Fig. 18, looking in the direction of the arrows.

Fig. 20 is longitudinal elevation of the inner cylinder shown in Fig. 17.

From the drawings, it will be seen that the present invention comprises a contained bearing or bushing that can be kept cooled by circulating lubricating oil through the unit. The same oil that cools is used to lubricate the rotating shaft. The oil is circulated completely around the bearing, it being introduced at one end, and flowing out at the opposite end, or adjacent the inlet port after complete circulation throughout the length of the bearing housing in one direction and back in the reverse direction. Capillary feeder elements or wicks in constant engagement with the circulating oil and the rotating shaft are provided to lubricate the shaft through capillary action.

Referring more particularly to the drawings, the improved bearing construction shown in Figs. 1 and 2, an outer cylindrical housing 1 is subdivided by internal webs 2 and 4 that extend transversely across the interior of the cylinder at right angles to the length thereof, and divide the cylinder 1 into a plurality of internal compartments 3, 5, and 7. The end compartment 3 is provided with an intake port 9, and communicates with compartment 5 through a port 10 extending through the web 2. Compartment 5 communicates with compartment 7 through a port 11 extending through the web 4 and spaced 180° from the port 10. The webs 2 and 4 are provided with aligned holes 8, as well as the ends 12 and 13 of the cylinder, which holes are of sufficient diameter to receive snugly the hollow inner cylinder 14 which receives the rotating shaft 15. The inner cylinder is supported rigidly throughout its length by the ends 12 and 13 of the outer cylinder 1, and by the webs 2 and 4. This enables the inner cylinder 14 to be substantially reduced in its wall thickness without deflection of the inner cylinder and shaft. In practice, the wall of the inner cylinder is only sufficiently thick to receive the holes 16 which extend all the way through the cylinder wall for receiving the capillary wicks 17, the ends of which wicks extend to the compartments 3, 5, and 7. These capillary wicks or feeders continuously engage the rotating shaft 15 as clearly indicated in Fig. 2, these wicks 17 being cut out to conform to the periphery of the shaft 15. These lubricating feeders or wicks are provided in staggered relation. Two of such holes and wicks are provided for the compartments in one portion thereof, and a single hole and wick is provided 180° from the two holes, there being one hole and wick thus disposed for each compartment making a total of three wicks making working contact with the shaft 15 in each compartment, the staggered disposition of the wicks lubricating the shaft uniformly throughout its length.

Lubricating oil X is introduced into the outer cylinder 1 through intake port 9, filling the end compartment 3, passing through port 10 into the intermediate compartment 5 and thence through port 11 into the other end compartment 7, the oil passing out from the cylinder 1 through outlet port 18 in the end compartment 7, the intake port 9 and the outlet port 18 being at opposite ends of the bearing and spaced 180 degrees apart. This assures that the lubricating oil will flow in a continuously reversing path from top to bottom of the compartments as the oil continuously flows forwardly therethrough from the intake port 9 to the discharge port 18, thereby continuously surrounding the inner cylinder 14 and also engaging the capillary wicks 17, saturating these wicks with oil, which wicks lead the oil by capillarity to the rotating shaft 15 to lubricate this shaft continuously, while maintaining the assembly effectively cooled. The oil may be circulated either by means of a pump or by gravity.

It will be understood that the number of compartments, which means the number of reversals of direction in the flow of the oil, may be varied without departing from the invention, this being a detail of structural design.

In the modification shown in Figs. 3 through 7, outer cylinder 19 is provided with a continuous spiral rib 20, which makes the compartment 21 in actuality a continuous compartment through which the oil circulates around the inner cylinder 22 from inlet port 23 at one end of the outer cylinder 19 to the outlet port 24 at the other end, the spiral configuration of the rib 20 and the spiral circulating compartment 21 reversing direction of the flow of the oil at each turn of the spiral. The rib 20 rigidly supports the inner cylinder 22 throughout its entire length. The inner cyliner 22 is provided suitably with holes 25 for receiving capillary wicks 26 which are similar to the wicks 17 described above, and which make wiping contact with the shaft 27 to lubricate the shaft, as will be apparent from the drawings.

It also will be apparent that the direction of flow of the oil will be reversed at each reversal of direction of the turns of the spiral rib 20, from top to bottom of the compartment 21 as it passes from inlet port 23 to outlet port 24 as there are turns in the spiral rib 20. The oil may be circulated either by a pump (not shown) or by gravity.

Figs. 8 through 14 show a still further modification. In these views the outer cylinder is indicated at 28, which receives snugly the inner cylinder 29 in close engagement with the inner surface of the outer cylinder 28. The inner cylinder 29 is provided with a continuous, endless oil-receiving and circulating channel 30. This channel receives oil from inlet 31 at the top of the outer cylinder 28, and passes transversely in opposite directions across the top of the inner cylinder 29, as indicated at 32 in the drawings, thence at substantially right angles along the length of the cylinder as indicated at 33 and 39, transversely around the cylinder as indicated at 34 and 38, again at right angles thereto along the length of the cylinder as indicated at 35 and 37, thence transversely as indicated at 36, thence to discharge port 32', which is located diametrically opposite to the intake port 31. Each half of the inner cylinder 29 is provided with a pair of longitudinally extending channels joined by a transverse channel, the oil changing its direction of flow at right angles four times in each half of the cylinder, reversing the direction of its flow three times from top to bottom as it flows around the inner cylinder 29 as it flows from the inlet port 31 to outlet port 32'. Adjacent longitudinal channels 30, 35 and 39, 37 are connected by holes 41 in which are received the capillary wicks 42 which lubricate the rotating shaft (not shown in these views) that is inserted in aperture 43 in the inner cylinder, and with which the wicks 42 make wiping contact as described above, for purposes of lubricating the shaft. The oil circulating channel extends into each quadrant of the inner cylinder 29.

In the modification shown in Figs. 15 through 20, the circulating channel is defined by longitudinally extending ribs 44 which rigidly support the inner cylinder, extending from the outer cylinder 45 to the inner cylinder 46, forming a rigid support for the latter, and defining longitudinal chambers 47 for the oil, these chambers communicating at their opposite ends through ports 48 in the longitudinally extending ribs 44. The inner cylinder 46 has holes 49 therethrough for the reception of the capillary wicks 50, which make wiping contact with shaft 51, as has been described in the previous modifications.

In all of the described forms of the construction, the capillary wicks referred to for leading portions of lubricant from the chambers through which it is circulating to the shaft operating in the bearings preferably are made of a suitable wood selected for its proper porosity and capillary action on the oil.

It will be seen also in each form of the device, the cooling oil circulates over substantially the entire surface of the inner cylinder, in circuitous paths of circulation in which the direction of flow of the oil is reversed a plurality of times between the inlet and outlet as the oil flows continuously forwardly through the spaces between the inner and outer cylinders.

In Fig. 15, the inlet for the oil is indicated at 52 and the outlet at 53, these being on opposite sides of a partition rib 44 as shown in Fig. 16.

In all of the illustrated forms of the invention the oil may be circulated either by a pump or by gravity, and the same oil is used for cooling and lubricating.

As has been pointed out above, each of the modified forms of the construction embodies a contained bearing or bushing that can be kept cool by circulating oil through the unit. The same oil that cools is used to lubricate through the provisions of the wooden capillary wicks or feeders. The supporting ribs defining the oil-circulating channels allow the internal cylinder to be reduced in wall thickness and at the same time support the internal cylinder so that it cannot deflect, thus saving space and material.

The construction of the invention can be used with a gravity system of oil supply wherein the inner cylinder can be supported and at the same time be made with a thin wall, when the circulating cooling principle is not needed. When the cooling becomes a factor the unit is adapted to have oil circulated through it by opening the discharge hole through the unit to cool it. As has been pointed out above, on very high class precision lathes, great trouble is experienced in the bearings becoming hot, which in turn heats up the head-stock.

The heat causes the head-stock to expand materially, causing errors in tooling set-ups, as the bearing becomes hotter the discrepancy becomes greater. This is a continual source of trouble to manufacturers who do precision work. In some instances it is necessary to start the machine several hours before work is to be done on them so that the bearings will reach their maximum temperature before the machines are put into production. By connecting up all of the cubical bearings with this type of bearing, oil can be made to circulate through the entire system by means of a pump and a system of piping. With a storage tank of correct size for the circulating oil, the circulating oil can be maintained at a relatively low temperature, that is, a few degrees above room temperature. This circulating oil will hold the bearing temperature at a relatively low value, and thus eliminate the expansion on machine parts due to high temperature in the bearing. In most modern machines, the space or room for bearings is quite limited and by the use of proper ribs or grooves, both the outer and inner members of the bearing may be made quite thin, and at the same time will not deflect under heat.

It will be apparent from the foregoing description that the details of the present construction may be varied within wide limits without departing from the inventive concept. Consequently, it will be understood that it is intended and desired to embrace within the scope of this invention such modifications and changes as may be necessary to adapt it to varying conditions and uses, as defined by the appended claims.

Having thus described the invention, what I desire protected by Letters Patent is as set forth in the following claims:

1. A bearing unit comprising, in combination, an outer housing, an inner bearing retained in the outer housing in spaced relation therewith, means for supporting the inner bearing, the said means defining tortuous oil passages around the inner bearing, means for introducing lubricating oil into the oil passages through the outer housing, means enabling continuous circulation of lubricating oil through the passage from one end of the outer housing to an opposite end, the passages producing a plurality of reversals in direction of circulation of the lubricating oil from top to bottom of the passages as the oil continuously circulates longitudinally through the bearing unit, thereby cooling the inner bearing longitudinally therealong, and capillary feeding means mounted in the inner bearing and contacting the lubricating oil in the diametrically opposite portions of the passages, the feeding means engaging with wiping contacts a shaft operated in the inner bearing member.

2. A bearing unit comprising, in combination, an outer housing, an inner bearing member rigidly mounted in the outer housing, the said unit having opposite ends, tortuous oil passage means between the outer housing and the inner bearing member for enabling circulation of lubricating oil between the outer housing and the inner bearing member, the passage means having a zig-zag configuration for changing the direction of flow of the oil a plurality of times during its circulation for maintaining intimate thermal contact with the inner bearing member over the entire surface thereof, and capillary wick means extending through the inner bearing member engaging diametrically opposite portions of oil circulating between the outer housing and inner bearing member and in wiping contact with a shaft operating in the inner bearing member for feeding portions of the circulating oil to the said shaft for lubricating the shaft while cooling the inner bearing member.

3. A bearing unit comprising, in combination, an outer housing, an inner bearing member rigidly mounted in the outer housing, the said unit having opposite ends, tortuous oil passage means between the outer housing and the inner bearing for enabling circulation of lubricating oil between the outer housing and the inner bearing member, the passage means reversing the flow of oil circulating therethrough a plurality of times between the top and bottom of the bearing unit during continuous circulation of the oil along the inner bearing member, whereby the circulating oil is maintained in uniform thermal contact with the inner bearing member over the entire surface thereof, capillary wick feeding means mounted in the inner bearing member in contact with the circulating oil and with a shaft in the inner bearing member for applying portions of the circulating oil to the shaft for lubricating the shaft, oil inlet means in the outer housing for introducing oil into the passage means, and oil outlet means in the outer housing for removing oil after circulation from the passage means, the oil inlet means and the outlet means being relatively disposed remotely from each other for causing circulation of oil completely around the inner bearing member.

4. A bearing unit comprising in combination, an outer housing, a plurality of spaced ribs in the housing, an inner bearing member mounted in the outer housing and rigidly held by the ribs, an inlet in the outer housing adjacent to an end thereof, ports extending through the ribs spaced approximately 180° apart thereby placing in communication chambers defined between the ribs whereby oil introduced through the inlet may circulate through the chambers after filling thereof, the said chambers enclosing the inner bearing member and causing circulating oil to reverse its direction of flow between top and bottom of the chambers a plurality of times as it circulates through the outer bearing and around the inner bearing member, capillary wick feeding means for the oil mounted in the inner bearing member engaging the circulating oil, the said feeding means being in engagement with opposite portions of the circulating oil and in wiping contact with a shaft operating in the bearing, thereby diverting portions of the circulating oil to lubricate the shaft, and outlet means for the circulating oil positioned at an end of the outer bearing remote from the inlet, the outlet means being disposed at approximately 180° from the inlet.

5. A bearing unit comprising, in combination, an outer housing, a plurality of spaced ribs in the housing, an inner bearing member mounted in the outer housing and rigidly held by the ribs, an inlet in the outer housing adjacent to an end thereof, ports extending through the ribs spaced approximately 180° apart, thereby placing in communication oil circulating chambers defined between the chambers and inclosing the inner bearing member, whereby oil introduced through the inlet may circulate through the chambers after filling thereof, the said chambers causing the circulating oil to reverse its direction of flow a plurality of times between top and bottom of the chambers as it circulates through the outer housing and around the inner bearing member, wooden capillary feeding means for the oil mounted in the inner bearing member engaging diametrically opposite portions of the circulating oil, the said feeding means being in wiping engagement with a shaft operating in the inner bearing member thereby diverting portions of the circulating oil to lubricate the shaft, and outlet means for the circulating oil positioned at an end of the outer housing remote from the inlet and disposed relative to the inlet for draining oil from the bearing while maintaining the communicating chambers continuously filled with circulating oil.

6. A bearing unit comprising, in combination, an outer housing having an inlet and an outlet end, a continuous spirally disposed rib in the outer housing extending from the inlet end to the outlet end, an inner bearing member in the outer housing rigidly held by the spiral rib, the said spiral rib defining a spiral oil-circulating chamber enclosing the inner bearing member from the inlet end of the housing to the outlet end, inlet means for introducing oil into the inlet end for circulation through the spiral chamber around the inner bearing member, the said chamber causing the circulating oil to reverse its direction of flow a plurality of times between top and bottom of the chamber as it continuously circulates through the spiral chamber around the inner bearing member, capillary wick feeding means for the oil mounted in the inner bearing member in contact with diametrically opposite portions of the circulating oil, the said capillary bearing means also being in wiping engagement with a shaft operating in the bearing, thereby diverting portions of the circulating oil to lubricate the shaft, and outlet means for the circulating oil positioned at the outlet end of the housing and disposed relative to the inlet means for discharging oil from the housing after it circulates from the outlet end to the outlet end thereof while maintaining the spiral circulation chamber continuously filled with circulating oil.

7. A bearing unit comprising, in combination, an outer housing having an inlet end and an outlet end, rib means in the housing, an inner bearing member mounted in the housing and rigidly held by the rib means, the said rib means defining oil-circulating chambers enclosing the inner bearing member, oil passage means in the rib means placing the oil-circulating chambers in communication, the oil-passage means being disposed to maintain the oil-circulating chambers filled with circulating oil, inlet means for introducing oil into the oil-circulating chambers, the said chambers and oil-passage means causing a plurality of reversals of direction of circulation of the oil passing therethrough and between top and bottom of the chambers, capillary feeding means for the oil engaging diametrically opposite portions of the circulating oil, the said feeding means being also in intimate wiping engagement with a shaft operating in the inner bearing member, the feeding means being disposed to supply oil uniformly along the shaft, thereby diverting portions of the circulating oil to lubricate the shaft, and outlet means for the circulating oil positioned at the outlet end of the housing for draining oil from the housing while maintaining the circulation chambers continuously filled with circulating oil.

8. A bearing unit comprising, in combination, an outer housing having an oil inlet and an oil outlet, an inner bearing member rigidly held in the outer housing, means for continuously circulating oil between the outer housing and the inner bearing member, the said means inclosing the said inner bearing member between the oil inlet and the oil outlet and producing a plurality of reversals of direction of oil circulating therethrough from the oil inlet to the oil outlet, the reversals being between the top and bottom of the inner bearing along the outer periphery thereof and capillary feeding means for the oil engaging diametrically opposite portions of the circulating oil and also intimately wipingly engaging a shaft operating in the inner bearing member for lubricating the shaft, the feeding means diverting continuously portions of the circulating oil from the circulating means to the shaft, the said oil outlet being disposed relatively to the oil inlet for continuously maintaining the circulating means filled with circulating oil while continuously drawing oil from the housing.

9. A bearing unit comprising in combination, an outer housing having an oil inlet and an oil outlet, an inner bearing member rigidly held in the outer housing, a tortuous oil-circulating channel in the inner bearing member, defining a continuous tortuous oil-circulating chamber between the outer housing and the inner bearing member enclosing the inner bearing member, the chamber extending longitudinally of the inner bearing member and transversely thereof and effecting a plurality of reversals in direction of flow of circulating oil over each quadrant of the inner bearing member between the top and bottom thereof, and spaced capillary wood feeding means mounted in the inner bearing member communicating with diametrically opposite portions of the oil in the circulating chamber and engaging with a shaft operating in the inner bearing member for lubricating the shaft thereby diverting continuously portions of circulating oil to the shaft for lubricating the shaft, the oil outlet being disposed relatively to the oil inlet to maintain the oil circulating chamber continuously filled with circulating oil while continuously drawing oil from the chamber.

10. A bearing unit comprising in combination, an outer housing, a plurality of spaced webs extending transversely of the housing, an inner tubular bearing member mounted in the outer housing and rigidly held by the webs, the housing having an inlet end and an outlet end, the said webs defining with the inner bearing member a plurality of oil-receiving compartments enclosing the bearing member, the said webs having ports therethrough to bring the compartments into communication with one another, a port through one web being disposed at approximately 180° from the port in an adjacent web, whereby the compartments may be maintained filled with oil, an oil intake in the inlet end and an oil outlet in the outlet end of the bearing whereby oil may be circulated continuously through the compartments around the inner bearing member, and a plurality of spaced capillary feeders mounted in the inner bearing members extending therethrough and interiorly thereof in contact with diametrically opposite portions of the oil and in intimate wiping engagement with a shaft operating in the bearing member to supply oil in the compartments to the said shaft, thereby diverting portions of the circulating oil to the shaft to lubricate the shaft.

11. A bearing unit comprising in combination, an outer housing, a plurality of spaced ribs extending longitudinally of the housing, an inner tubular bearing member mounted in the outer housing and rigidly held by the ribs, the housing having an inlet end and an outlet end, the said ribs defining with the inner bearing member a plurality of longitudinally extending oil-receiving compartments, the ribs having ports therethrough disposed relatively to one another to maintain the compartments filled with oil while enabling oil to flow from one compartment to another, an oil inlet in the inlet end of the bearing for introducing oil into the compartments, an oil outlet in the outlet end of the housing for defining oil continuously from the compartments, the oil inlet and outlet being disposed relative to each other to maintain all the compartments filled with circulating oil which enclose the inner bearing member, and wooden oppositely staggered oil-feeding members spacedly mounted in the inner bearing member and extending therethrough and interiorly thereof having ends contacting with diametrically opposite portions of the oil, and in wiping engagement with a shaft member operating in the said tubular bearing member for contacting circulating oil in oppositely disposed compartments for lubricating the shaft with oil continuously withdrawn from the circulating oil in the oppositely disposed compartments, whereby the same oil is used for cooling and lubricating purposes.

CARTER N. PADEN.

REFERENCES CITED

The following references are of record in the file of this patent:

UNITED STATES PATENTS

| Number | Name | Date |
| --- | --- | --- |
| 1,108,064 | Bonom | Aug. 18, 1914 |
| 1,108,761 | Kieser | Aug. 25, 1914 |
| 1,386,962 | Sharp | Aug. 9, 1921 |